United States Patent
Diemer et al.

(10) Patent No.: US 8,117,935 B2
(45) Date of Patent: Feb. 21, 2012

(54) SYNCHRONIZER ACTUATING SYSTEM WITH SELECTIVES

(75) Inventors: John A. Diemer, Farmington Hills, MI (US); Brian Tooman, Canton, MI (US); Fredrik Englund, Trollhattan (SE); Robert Roessner, Mainz-Ebersheim (DE); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 849 days.

(21) Appl. No.: 12/174,275

(22) Filed: Jul. 16, 2008

(65) Prior Publication Data

US 2009/0031836 A1 Feb. 5, 2009

Related U.S. Application Data

(60) Provisional application No. 60/953,730, filed on Aug. 3, 2007.

(51) Int. Cl.
*F16H 59/00* (2006.01)
(52) U.S. Cl. .......................................................... 74/335

(58) Field of Classification Search ............. 192/48.602, 192/48.607, 48.9, 85.56, 85.57; 475/335; 74/473.1, 473.11, 473.37
See application file for complete search history.

(56) References Cited

U.S. PATENT DOCUMENTS

| 3,441,117 | A | * | 4/1969 | McNamara | ................ | 192/109 F |
| 4,970,942 | A | * | 11/1990 | Sibeud et al. | ................... | 91/519 |
| 7,845,247 | B2 | * | 12/2010 | Olds et al. | ....................... | 74/333 |
| 2010/0175493 | A1 | * | 7/2010 | Spaeth et al. | .............. | 74/473.11 |

* cited by examiner

*Primary Examiner* — David D Le
*Assistant Examiner* — David J Hlavka

(57) ABSTRACT

A synchronizer actuating system with selectives for use in dual clutch transmission is provided. The synchronizer actuating system includes an apply finger and a fork mounted on a shift rail. The fork grips a synchronizer sleeve that supports a synchronizer. The synchronizer is moveable to a neutral position. A three area piston assembly is operable to engage and actuate the apply finger. The three area piston assembly includes a hydraulic neutral position. A selective element is coupled to the synchronizer actuating system to calibrate the hydraulic neutral position of the three area piston assembly to the neutral position of the synchronizer sleeve.

20 Claims, 4 Drawing Sheets

SYNCHRONIZER ACTUATING SYSTEM WITH SELECTIVES

CROSS-REFERENCE TO RELATED APPLICATIONS

This application claims the benefit of U.S. Provisional Application No. 60/953,730, filed on Aug. 3, 2007. The disclosure of the above application is incorporated herein by reference.

FIELD

The present disclosure relates to a synchronizer actuating system, and more particularly to a synchronizer actuating system with selectives for use in a transmission.

BACKGROUND

The statements in this section merely provide background information related to the present disclosure and may or may not constitute prior art.

A typical dual clutch transmission (DCT) includes a plurality of gears actuated by a synchronizer actuating system. The synchronizer actuating system generally includes a synchronizer that is operable to engage a transmission gear set. The synchronizer is coupled to a moveable rail having an apply finger. The synchronizer is moveable by the apply finger and rail between various positions, including a neutral/detent position. The DCT typically has extra hydraulic pressure, and therefore the apply finger may be hydraulically actuated by a piston arrangement.

One such piston arrangement includes three area pistons that engage the apply finger to hydraulically actuate the synchronizer actuating system. With a three area piston arrangement, it is possible to employ a hydraulic neutral position wherein hydraulic pressure is applied to all three pistons to place the apply finger in a neutral position.

However, the neutral position of the three area pistons and therefore the neutral position of the apply finger with respect to the neutral position of the synchronizer may vary in any given transmission due to tolerance stacking and assembly issues. Therefore, there is room in the art for a synchronizer actuating system that calibrates the hydraulic neutral position of the piston arrangement with the neutral position of the synchronizer for any given transmission.

SUMMARY

The present invention provides a synchronizer actuating system with selectives for use in dual clutch transmission.

In one aspect of the present invention, the synchronizer actuating system includes an apply finger and a fork mounted on a shift rail. The fork grips a synchronizer sleeve that supports a synchronizer. The synchronizer is moveable to a neutral position. A three area piston assembly is operable to engage and actuate the apply finger. The three area piston assembly includes a hydraulic neutral position. A selective element is coupled to the synchronizer actuating system to calibrate the hydraulic neutral position of the three area piston assembly to the neutral position of the synchronizer sleeve.

In another aspect of the present invention, the selective element is coupled to the apply finger.

In still another aspect of the present invention, the selective element is coupled to the three area piston assembly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
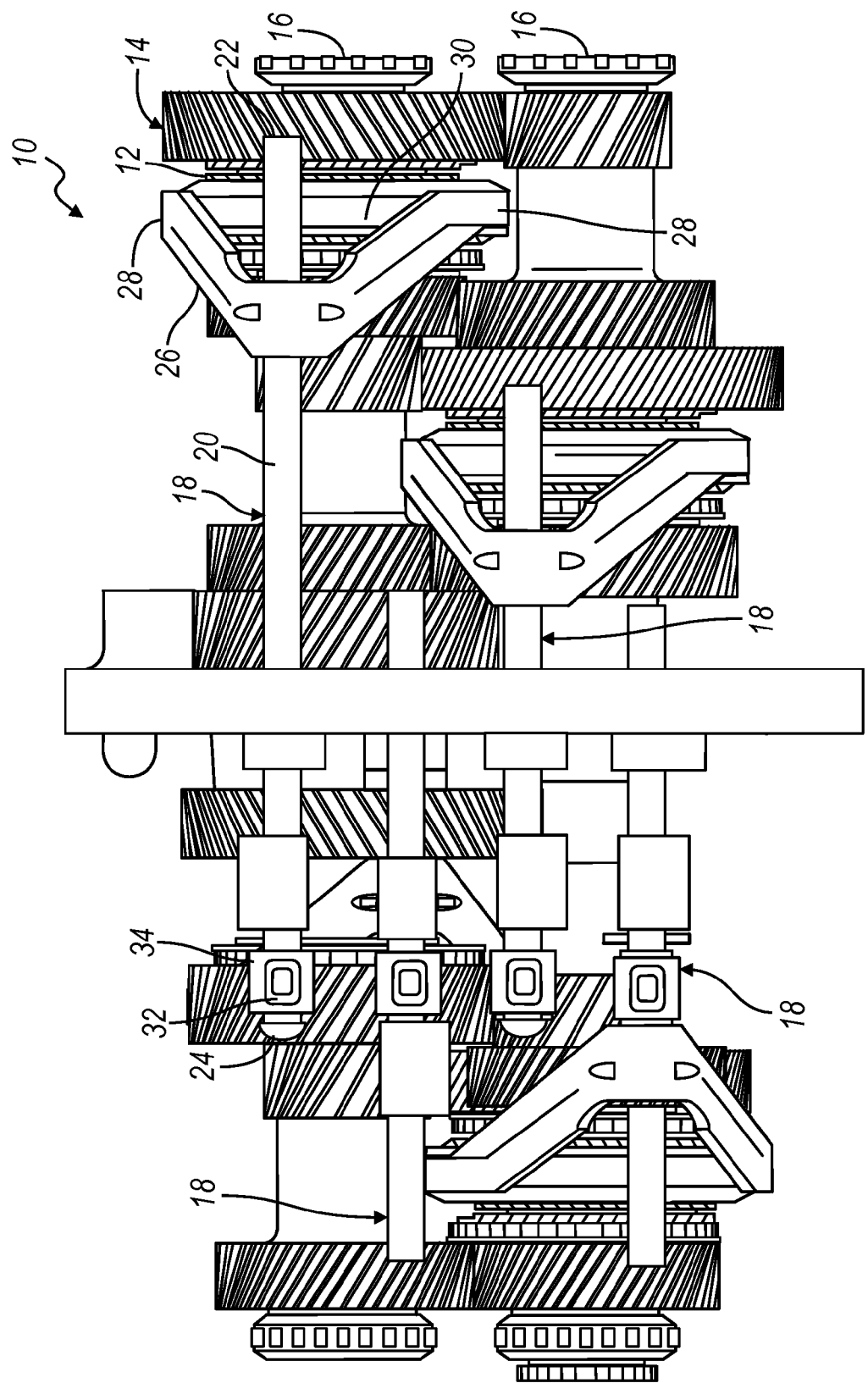
FIG. 1 is a top view of a synchronizer actuating system according to the principles of the present invention shown with an exemplary gear set.

With reference to FIG. 1, a synchronizer actuating system is shown and generally indicated by reference number 10. The synchronizer actuating system 10 is configured to actuate a plurality of synchronizers 12 in a dual clutch transmission (not shown). The synchronizers 12 are operable to couple a plurality of gear sets 14 to shafts 16 or to another of the gear sets 14. Actuation of the synchronizers 12 by the synchronizer actuating system 10 allows the plurality of gear sets 14 within the transmission to produce a plurality of forward and reverse gear ratios. The synchronizers 12 are therefore moveable between a plurality of positions relative to the gear sets 14 and the shafts 16. The plurality of positions include a neutral position wherein the synchronizer 12 does not couple the gear sets 14 to the shafts 16.

The synchronizer actuating system 10 generally includes a plurality of synchronizer actuating elements or shifting assemblies 18 that are each coupled to a single synchronizer 12. In the particular example provided, four synchronizer actuating elements 18 and synchronizers 12 are illustrated, though it should be appreciated that any number of synchronizer actuating elements 18 and synchronizers 12 may be employed with any number of gear sets 14 and shafts 16 without departing from the scope of the present invention. Each synchronizer actuating element 18 is substantially similar to another, accordingly, only one synchronizer actuating element 18 will be described in detail.

Each synchronizer actuating element 18 generally includes a shift rail 20. The shift rail 20 has a first end 22 opposite a second end 24. A synchronizer fork 26 is mounted on the shift rail 20 near the first end 22. The synchronizer fork 26 includes a pair of extending fork arms 28. The fork arms 28 grip or are otherwise coupled to a synchronizer sleeve 30. The synchronizer sleeve 30 is sized to receive the synchronizer 12 therein.

The synchronizer actuating element 18 further includes an apply finger or shifting member 32 mounted on the shift rail 20 near the second end 24. The apply finger 32 includes an extension 34 that extends out from the apply finger 32. The position of the apply finger 32 is fixed relative to the synchronizer 12 such that movement of the apply finger 32 translates to movement of the synchronizer 12 between the plurality of synchronizer positions, including the neutral position.

Figure 2:
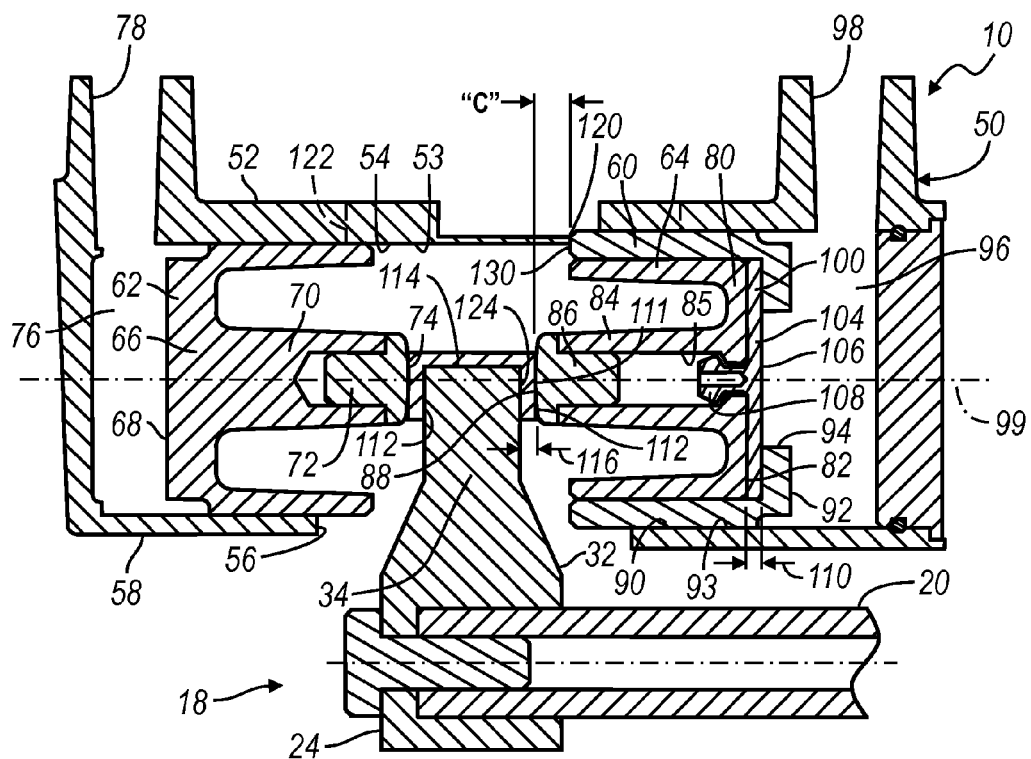
FIG. 2 is a side schematic view of a portion of the synchronizer actuating system of the present invention.

With reference to FIG. 2, the synchronizer actuating system 10 is moved by an actuator or piston assembly 50. The piston assembly 50 is operable to actuate the synchronizer actuating element 18 via the apply finger 32, as will be described further below. Accordingly, the number of piston assemblies 50 is equal to the number of synchronizer actuating elements 18. As each piston assembly 50 is substantially similar to another, only one piston assembly 50 will be described in detail. The piston assembly 50 includes an actuator body 52 having an inner surface 53 that defines a cylindrical bore 54. The actuator body 52 further defines an apply finger window 56 extending from a bottom surface 58 of the actuator body 52 to the inner surface 53. The apply finger window 56 is sized such that when the piston assembly 50 is installed within a transmission, the piston assembly 50 is located overtop the synchronizer actuating element 18 and the apply finger 32 extends through the apply finger window 56 into the cylindrical bore 54.

A plurality of pistons are located within the cylindrical bore 54 that include a first or large piston 60, a second or medium piston 62, and a third or small piston 64. The medium piston 62 is located within the cylindrical bore 54 on an opposite side of the apply finger window 56 than the large piston 60 and the small piston 64.

The medium piston 62 includes a body 66 having an outer surface 68 and an extending member 70 extending from a side of the body 66 opposite the outer surface 68. A button 72 is located at an end of the extending member 70. The button 72 defines a contact surface 74 at a distal end of the button 72. Alternatively, the extending member 70 and the button 72 may be a single unitary piece having the contact surface 74 at a distal end of the extending member 70. The outer surface 68 of the medium piston 62 and the inner surface 53 of the cylindrical bore 54 cooperate to define a first cavity 76 at an end of the cylindrical bore 54. A first passage 78 located within the actuator body 52 is connected to the first cavity 76. The first passage 78 is connected to a hydraulic fluid source (not shown).

The small piston 64 is located within and concentric to the large piston 60. The small piston 64 includes a body 80 having an outer surface 82 and an extending member 84 extending from a side of the body 80 opposite the outer surface 82. A bore 85 is formed in the body 80 and extends from the outer surface 82 into the extending member 84. A button 86 is located at an end of the extending member 84. The button 86 defines a contact surface 88 at a distal end of the button 86. Alternatively, the extending member 84 and the button 86 may be a single unitary piece having the contact surface 88 at a distal end of the extending member 84.

The large piston 60 is operable to move relative to the small piston 64 and generally includes an inner surface 90 and an outer surface 92. The inner surface 90 defines a space 93 sized to receive the small piston 64 therein. A hole 94 is located in the large piston 60 and extends from the inner surface 90 to the outer surface 92. The outer surface 92 of the large piston 60 and the inner surface 53 of the cylindrical bore 54 cooperate to define a second cavity 96 at an end of the cylindrical bore 54. A second passage 98 located within the actuator body 52 is connected to the second cavity 76. The second passage 98 is connected to a hydraulic fluid source (not shown).

The synchronizer actuating assembly 10 further includes a first selective element or first spacer 100 and a second selective element or second spacer 102 employed to calibrate the hydraulic neutral position of the piston assembly 50 with the neutral position of the synchronizer 12, as will be described in greater detail below. The first selective element 100 is located between the large piston 60 and the small piston 64. The first selective element 100 generally includes a planar disc portion 104 having an outer surface 106 and a snap member 108 extending from the planar disc portion 104 on an opposite side of the outer surface 106. The snap member 108 is sized to snap fit within the bore 85 of the small piston 64 in order to secure the first selective element 100 to the small piston 64. In this position, the first selective element 100 is located overtop the outer surface 82 of the small piston 64 and within the space 93 of the large piston 60. The planar disc portion 104 is characterized as having a particular width, indicated by reference number 110.

The second selective element 102 is located overtop an end of the extension 34 of the apply finger 32. More specifically, the second selective element 102 generally includes a hole 112 sized to receive an end 114 of the extension 34 therein. The second selective element 102 is characterized as having a particular wall width, indicated by reference number 116, between an outer surface 111 of the second selective element 102 and the hole 112.

Figure 3:
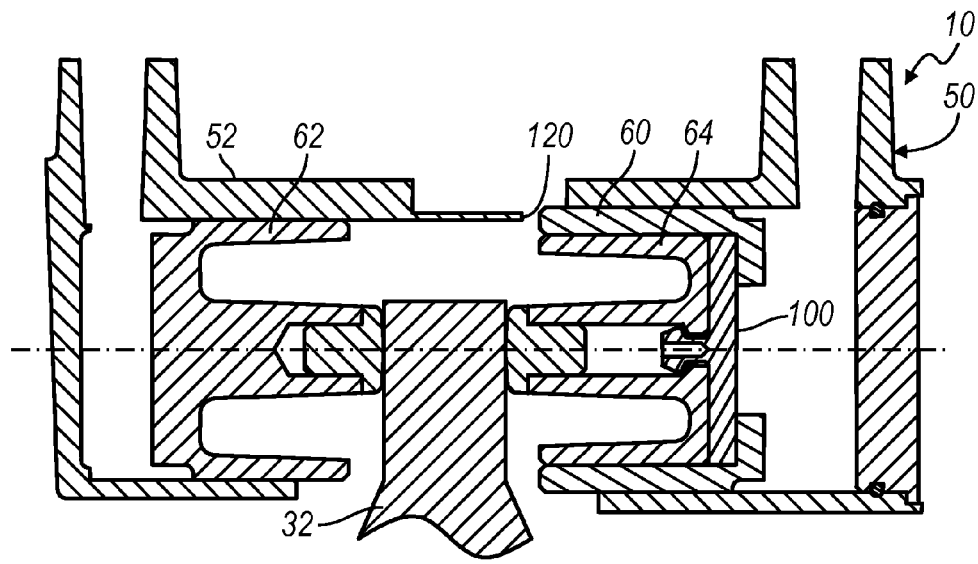
FIG. 3 is a side schematic view of an embodiment of the synchronizer actuating system of the present invention.
Figure 4:
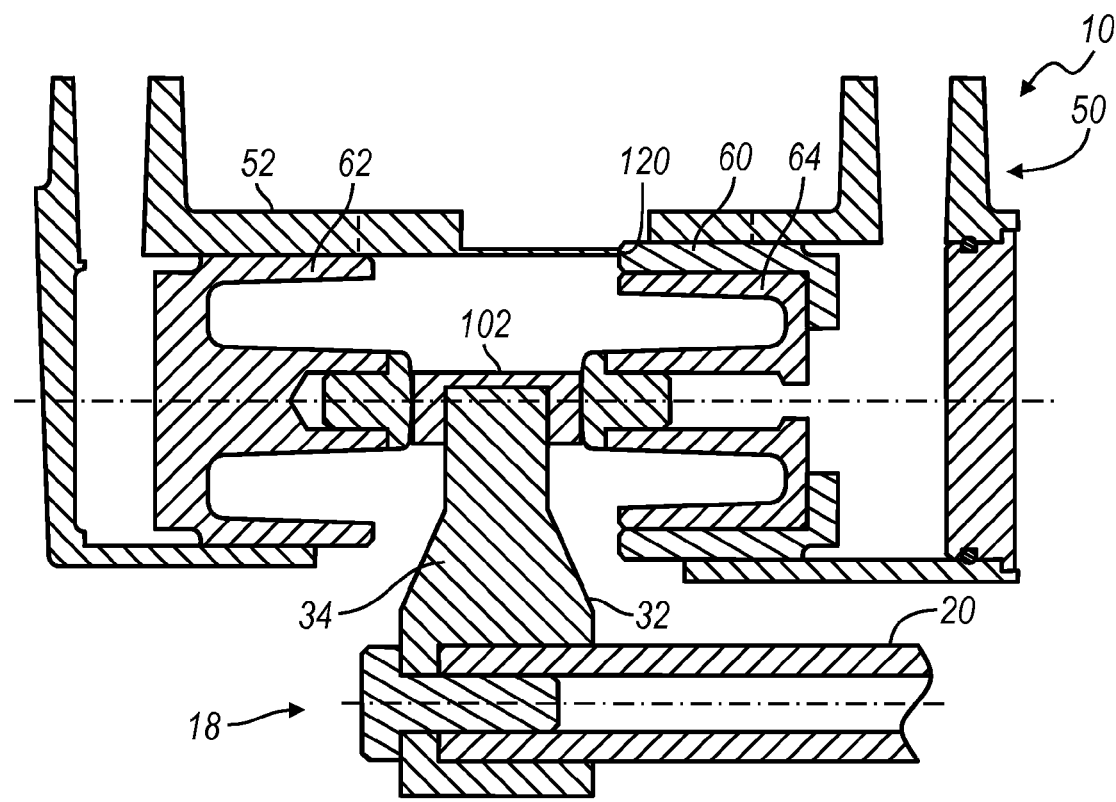
FIG. 4 is a side schematic view of another embodiment of the synchronizer actuating system of the present invention.

While in the particular example provided, both the first and second selective elements 100, 102 are simultaneously employed in the synchronizer actuating system 10, it should be appreciated that either selective element 100, 102 may be employed by itself without departing from the scope of the present invention. For example, FIG. 3 illustrates the synchronizer actuating system 10 having only the first selective element 100 and FIG. 4 illustrates the synchronizer actuating system 10 having only the second selective element 102. The selection of which selective element 100, 102 or combination thereof to employ may be base on various factors, such as the number of selective elements 100, 102 needed, availability of sizes, etc.

With combined reference to FIGS. 1-4, the operation of the synchronizer actuating system 10 will now be described. During operation of the synchronizer actuating system 10, hydraulic fluid is provided to the first and/or second cavities 76, 96. The hydraulic fluid acts on the outer surfaces 92, 68, 82 of the pistons 60, 62, 64 and moves the pistons 60, 62, 64 along an axis defined by the cylindrical bore 54 and indicated by reference number 99. As the pistons 60, 62, 64 translate along the axis 100, depending on the pressure of the hydraulic fluid provided to the cavities 76, 96, one or both of the extensions 70, 84 will engage and move the second selective element 102 and therefore the apply finger 32 of the synchronizer actuating element 18. Movement of the apply finger 32 in turn moves the shifting rail 20, the fork 26, the synchronizer sleeve 30, and finally the synchronizer 12 along an axis parallel to the axis 100. Movement of the synchronizer 12 allows for various gear combinations within the transmission.

The piston assembly 50 is actuatable by the hydraulic fluid to be positioned in a hydraulic neutral position, as is illustrated in FIG. 2. In the hydraulic neutral position, hydraulic fluid is provided to the cavities 76, 96 in an amount sufficient enough to move the large piston 60 against a stop 120 formed in the actuator body 52. The medium piston 62 then engages the second selective element 102 and urges the apply finger 32 against the button 86 of the small piston 64.

In order to match the hydraulic neutral position of the piston assembly 50 with the neutral position of the synchronizer 12, the selective elements 100, 102 are selected during assembly of the transmission from various sizes or gauges. The sizes of the selective elements 100, 102 relate to the sizes of the widths 110, 116 either in combination or singly, depending on whether one or both of the selective elements 100, 102 are to be employed (see FIGS. 3 and 4). Which particularly sized selective element 100, 102 to use may change for any given transmission and is based on the position of the apply finger 32 when the synchronizer 12 is in the neutral position relative to the location of the contact surface 88 of the small piston 64 when the large piston 60 is urged against the stop 120 when the piston assembly 50 is in the hydraulic neutral position.

For example, in one embodiment of the present invention the sizes of the selective elements 100, 102 are determined by directly measuring a distance "S" (not specifically labeled in the Figures) between a surface 124 of the extension 34 of the apply finger 32 and the contact surface 88 of the button 86 on the small piston 64 when the synchronizer actuating element 18 and the synchronizer 12 are in the neutral position and the large piston 60 is forced against the stop 120. The surface 124 is the portion of the apply finger that engages the contact surface 88 on the button 86 of the small piston 64. The distance "S" may be directly measured using a measuring device, such as a caliper, inserted into the cylindrical bore 54 through a window 122 formed in the actuator body 52. Once the distance "S" has been determined, a first selective 100 with a width 110 and a second selective 102 having a width 116 may be selected such that the summation of the widths 110 and 116 is approximately equal to the distance "S". Alternatively, when only one selective 100, 102 is employed, the widths 110, 116 are selected to be approximately equal to the distance "S".

Figure 5:
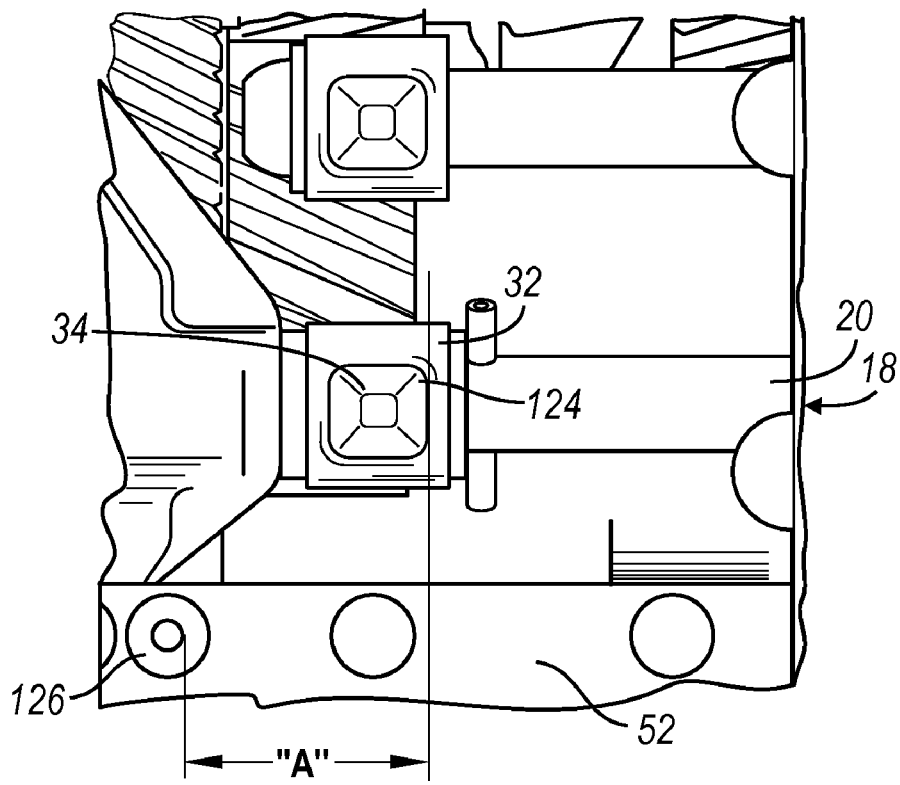
FIG. 5 is an enlarged top view of a portion of the synchronizer actuating system of the present invention.
Figure 6:
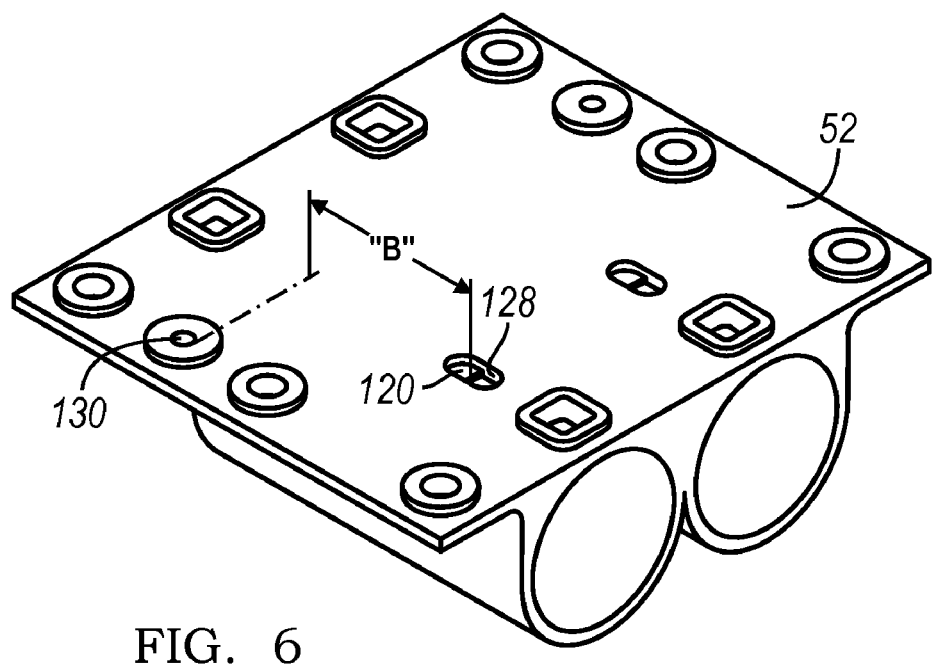
FIG. 6 is perspective view of an actuator body used in the synchronizer actuating system of the present invention.

In another embodiment of the present invention, the distance "S" may be calculated from a plurality of other measurements that do not require that the window 122 be located in the actuator body 52. For example, turning to FIG. 5, a distance "A" may be measured from the surface 124 of the apply finger 32 to the outer diameter of a dowel 126 coupled to the actuator body 52. Turning to FIG. 6, a distance "B" may be measured from the stop 120 through a window 128 formed in the actuator body 52 to the outer diameter of a hole 130 that receives the dowel 126 therein. Returning to FIG. 2, a distance "C" may be measured from the contact surface 88 to an edge 132 of the large piston 60 that engages the stop 120. Distance "C" may be measured prior to the large piston 60 and the small piston 64 being assembled within the actuator body 52. The distance "S" may then be calculated by subtracting distance "A" and distance "C" from distance "B". The appropriately sized selective element 100, 102 may then be selected using the calculated distance "S" in order to calibrate the hydraulic neutral position of the piston assembly 50 with the neutral position of the synchronizer 12.

The description of the invention is merely exemplary in nature and variations that do not depart from the gist of the invention are intended to be within the scope of the invention. Such variations are not to be regarded as a departure from the spirit and scope of the invention.

We claim the following:

1. An assembly for actuating a synchronizer in a transmission, the assembly comprising:
   an actuator including a housing, a first member slidably disposed within the housing, and a second member slidably disposed within the first member, the housing having a first surface, the first member having a first surface, and the second member having a first surface and a second surface, wherein the first surface of the first member opposes the first surface of the second member;
   a shift assembly interconnected to the synchronizer, the shift assembly including a shift member disposed at least partially within the housing of the actuator and having a contact surface opposing the second surface of the second member; and
   a spacer coupled to the shift member and positioned between the shift member and the first member of the actuator, and
   wherein the spacer and the second member of the actuator are in contact with the shift member and the first member when the first member contacts the first surface of the housing of the actuator.

2. The assembly of claim 1 wherein the spacer includes a bottom surface that defines a hole, and wherein the spacer is coupled to an end of the shift member such that the shift member is disposed within the hole.

3. The assembly of claim 1 wherein the spacer is in contact with the second surface of the second member and the first surface of the first member is in contact with the first surface of the second member when the first member is in contact with the first surface of the housing.

4. The assembly of claim 1 wherein the first member contacting the first surface of the housing corresponds to a neutral position of the actuator.

5. The assembly of claim 1 wherein the spacer and the second member of the actuator are in contact with the shift member and the first member when the shift assembly is in a neutral position corresponding to a neutral position of the synchronizer.

6. The assembly of claim 5 wherein the spacer includes a thickness, and the thickness of the spacer is selected to match a distance between the shift member contact surface of the shift member and the second surface of the second member when the actuator and the synchronizer are in neutral positions.

7. The assembly of claim 1 wherein the spacer is coupled to at least one of the first member and the second member.

8. The assembly of claim 7 wherein the spacer is disposed between the first member and the second member.

9. The assembly of claim 8 wherein the first member and the second member are moveable along a longitudinal axis between a plurality of positions, and wherein the spacer is disposed between the first surface of the first member and the first surface of the second member along the longitudinal axis.

10. The assembly of claim 9 wherein the spacer includes a snap member connected to a base portion, wherein the snap member is disposed within a bore located in the first surface of the first member to secure the spacer to the first member, and the base portion is located between the first member and the second member.

11. The assembly of claim 1 wherein the actuator further comprises a third member slidably disposed within the housing, and wherein the third member includes a first surface opposing a second surface of the shift member.

12. The assembly of claim 11 wherein the spacer is located on the shift member and contacts the first surface of the third member and the second surface of the second member when the first member contacts the first surface of the housing of the actuator and the synchronizer and the shift assembly are in a neutral position.

13. An assembly for actuating a synchronizer in a transmission, the assembly comprising:
   an actuator including a housing, a first member slidably disposed within the housing, and a second member slidably disposed within the first member, the first member having a first surface, and the second member having a first surface and a second surface, wherein the first surface of the first member opposes the first surface of the second member;

a shift assembly interconnected to the synchronizer, the shift assembly including a shift member disposed at least partially within the housing of the actuator; and a spacer coupled to the shift member and positioned between the shift member and the second member of the actuator, and wherein the spacer is in contact with the second surface of the second member of the actuator and the first surface of the second member is in contact with the first surface of the first member when the shift assembly and the synchronizer are in a neutral position and the first and second members are in a neutral position.

14. The assembly of claim 13 wherein the spacer includes a bottom surface that defines a hole, and wherein the spacer is coupled to an end of the shift member such that the shift member is disposed within the hole.

15. An assembly for actuating a synchronizer in a transmission, the assembly comprising:

an actuator including a housing, a first member slidably disposed within the housing, and a second member slidably disposed within the first member, the first member having a first surface, and the second member having a first surface and a second surface, wherein the first surface of the first member opposes the first surface of the second member;

a shift assembly interconnected to the synchronizer, the shift assembly including a shift member disposed at least partially within the housing of the actuator and having a contact surface opposing the second surface of the second member; and a spacer positioned between the first member and the second member, and wherein the second surface of the second member of the actuator is in contact with the contact surface of the shift member and the spacer is in contact with both the first surface of the second member and with the first surface of the first member when the shift assembly and the synchronizer are in a neutral position and the first and second members are in a neutral position.

16. The assembly of claim 15 wherein the first member and the second member are moveable along a longitudinal axis between a plurality of positions, and wherein the spacer is disposed between the first surface of the first member and the first surface of the second member along the longitudinal axis.

17. The assembly of claim 16 wherein the spacer includes a snap member connected to a base portion, wherein the snap member is disposed within a bore located in the first surface of the first member to secure the spacer to the first member, and the base portion is located between the first member and the second member.

18. The assembly of claim 17 wherein the actuator further comprises a third member slidably disposed within the housing, and wherein the third member includes a first surface opposing the shift member.

19. An assembly for actuating a synchronizer in a transmission, the assembly comprising:

an actuator including a housing, a first member slidably disposed within the housing, and a second member slidably disposed within the first member, a shift assembly interconnected to the synchronizer, the shift assembly including a shift member disposed at least partially within the housing of the actuator; and a spacer coupled to the shift member and positioned between the shift member and the first member of the actuator.

20. An assembly for actuating a synchronizer in a transmission, the assembly comprising:

an actuator including a housing, a first member slidably disposed within the housing, and a second member slidably disposed within the first member;

a shift assembly interconnected to the synchronizer, the shift assembly including a shift member disposed at least partially within the housing of the actuator and having a contact surface opposing the second member; and a spacer positioned between the first member and the second member.

* * * * *